May 2, 1961 F. HEBEL 2,982,592
MACHINE FOR DISPENSING REFRIGERATED ARTICLES
Filed March 20, 1956 3 Sheets-Sheet 1

Inventor
Fred Hebel

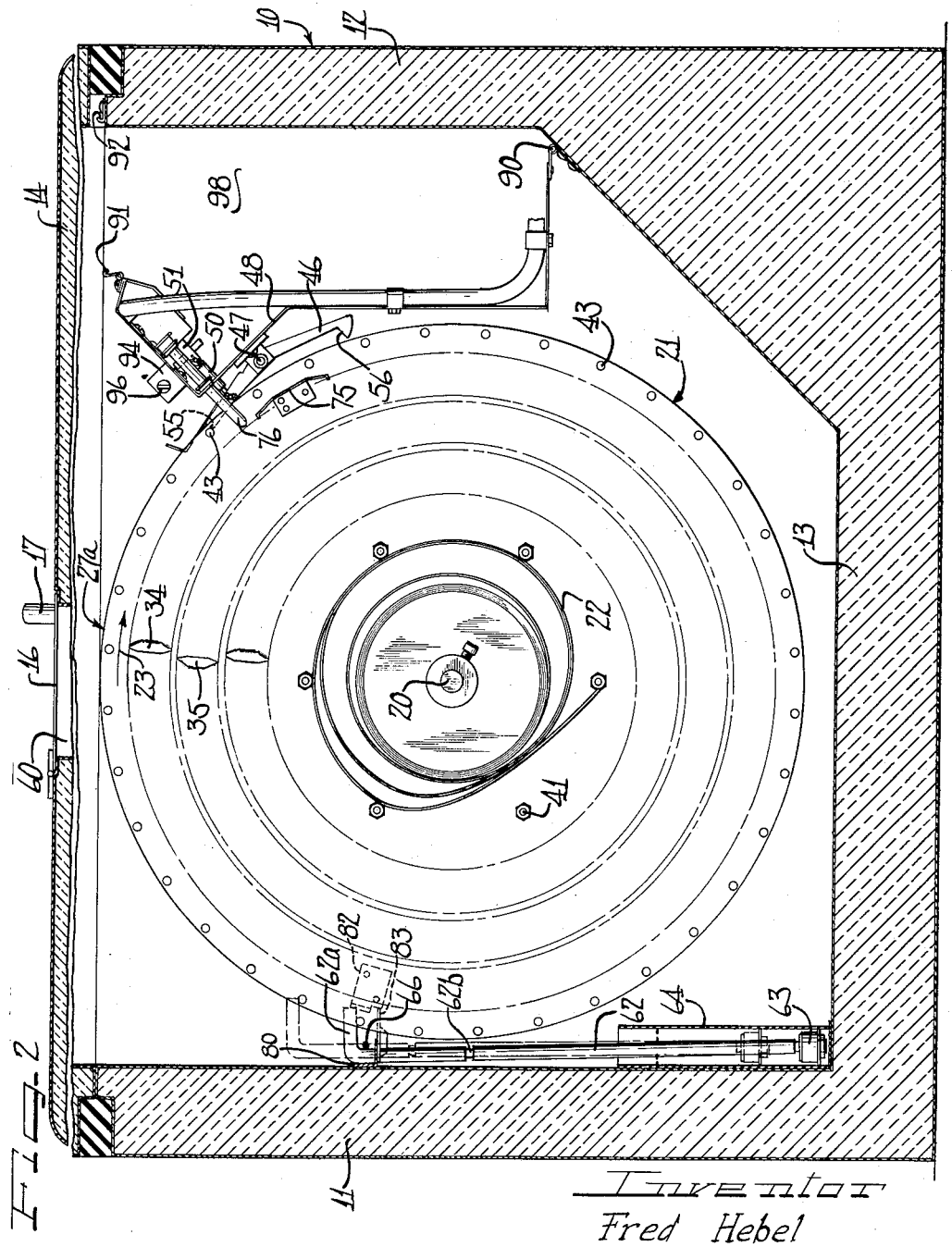

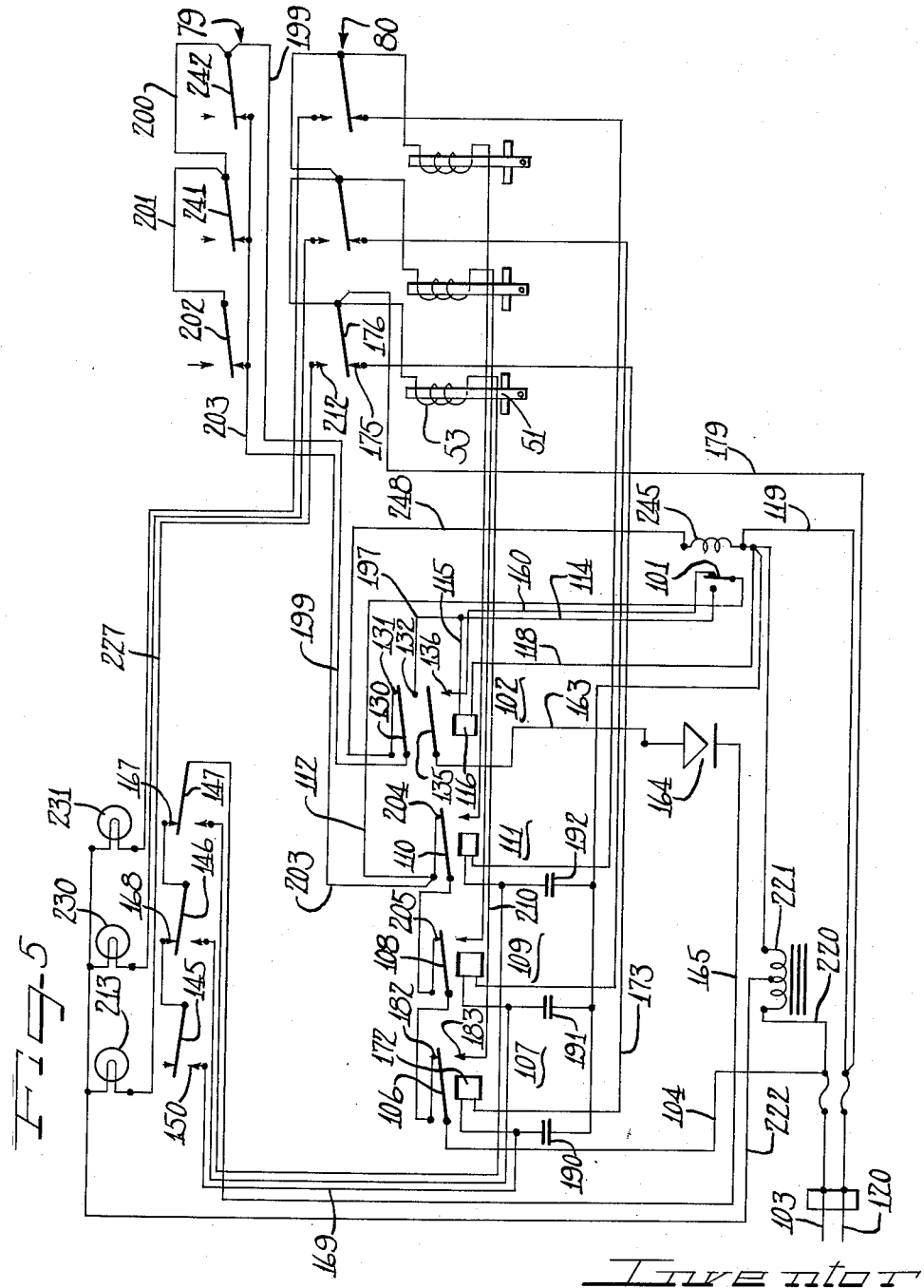

United States Patent Office 2,982,592
Patented May 2, 1961

2,982,592
MACHINE FOR DISPENSING REFRIGERATED ARTICLES

Fred Hebel, Wilmette, Ill., assignor to Fred Hebel Corporation, Addison, Ill., a corporation of Illinois Filed Mar. 20, 1956, Ser. No. 572,720

4 Claims. (Cl. 312—97.1)

This invention relates to dispensing apparatus and particularly to a machine for dispensing refrigerated articles.

It is an object of the present invention to provide a novel and improved dispensing apparatus.

It is a further object of the present invention to provide a dispensing apparatus having dispensing wheels controlled in their dispensing movement by an indexing mechanism which is readily shiftable to an inoperative position to allow removal of the dispensing wheels for cleaning and the like.

It is a further object of the present invention to provide a novel indexing sub-assembly for dispensing wheels.

It is still another object of the present invention to provide a novel control system and electric circuit for controlling dispensing action of a series of dispensing wheels.

Other objects, features and advantages of the present invention will be apparent from the following detailed description taken in connection with the accompanying drawings, in which:

Figure 2 is a fragmentary longitudinal sectional view through the machine of Figure 1, and illustrating certain of the parts of the mechanism;

Figure 5 is a schematic circuit diagram for controlling dispensing action of the machine of Figure 1.

As shown on the drawings:

Figure 1:
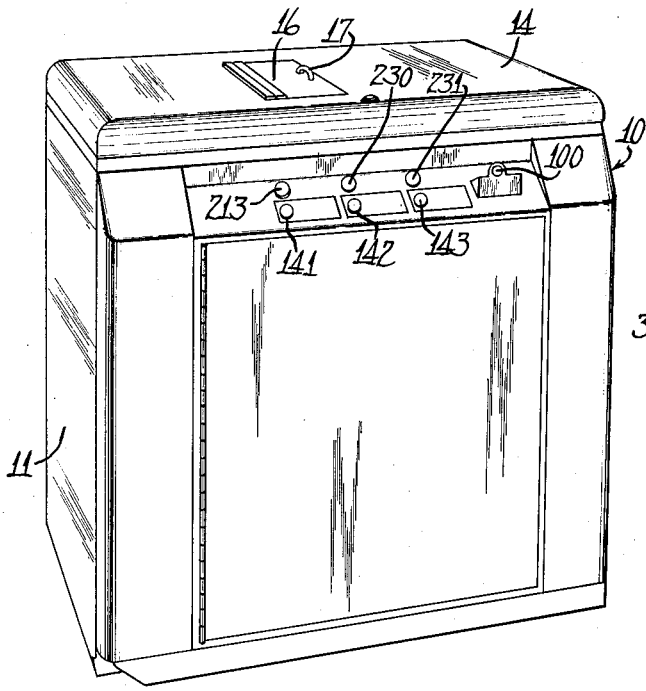
Figure 1 is a perspective view of a machine constructed in accordance with the present invention.

Referring to Figures 1 and 2, the machine of the illustrated embodiment comprises a body 10 having side walls such as 11 and 12 and a bottom wall 13 and an open top which is adapted to be closed by means of a cover 14 pivotally secured to the rear wall of the body 10. The cover 14 has an access door 16 mounted centrally thereof with a handle 17 for providing access to the interior of the machine.

Figure 3:
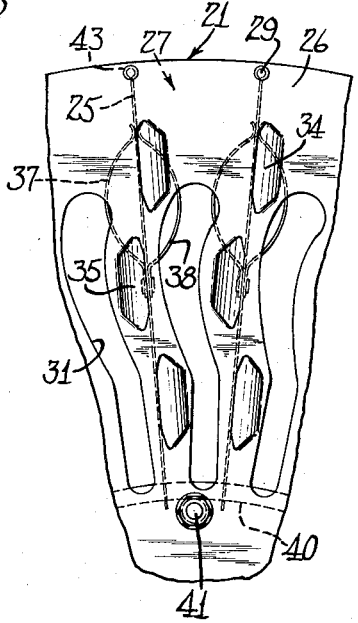
Figure 3 is a fragmentary elevational view of a portion of the dispensing wheels.

The machine includes a horizontal shaft 20 extending between the front and rear walls of the body 10 mounting, for example, three vertically disposed dispensing wheels 21 for individual rotation thereon. Suitable spring means 22 is associated with each of the wheels for urging the wheels to rotate in the direction of the arrow 23 in Figure 2. As illustrated in Figure 3, each dispensing wheel 21 may have radially extending walls such as 25 extending between disc like walls 26 to define compartments such as 27 opening at the periphery of the wheel. Suitable connecting pins such as 29 extend between the walls 26 to rigidly space the same. The walls 26 may have cut-out portions such as indicated at 31 for ease in cleaning the compartments 27, and the walls 26 may have lugs 34 and 35 struck out therefrom in such a way that the free edges of the lugs engage opposite sides of the radial walls 25 to rigidly position the same. Suitable spring means such as 37 and 38 are secured in each of the compartments 27 for retaining the article such as an ice cream bar in dispensing position in the compartment. By opening the door 16, access to one of the compartments 27 of each of the dispensing wheels is provided for removal of the article from the selected compartment. A ring 40 may extend about the shaft 20 within each wall, but may have an axial extent less than the spacing between the walls 26 of the wheel so as to provide an open bottom for the compartments 27 for ease of cleaning. Rods such as 41 may extend between the walls 26 to retain the same in rigid spaced relation. As seen in Figure 3, the radially extending walls 25 actually have ends curled over the pins 29 to provide transverse abutments 43 for purposes to be hereinafter described.

For controlling indexing movement of the dispensing wheels 21, an indexing mechanism is provided including an escapement 46 pivotally mounted on a shaft 47 to a mounting member 48. Rocking movement of the lever 46 is provided by means of a link 50 extending through the mounting member 48 and connected to the armature 51 of a solenoid coil 53 (Figure 5). When the solenoid is energized, lever 46 rocks into such a position that shoulder 55 of lever 46 releases the abutment 43 engaged thereby and hooked portion 56 of lever 46 engages one of the abutments 43 to allow the spring 22 to move the wheel 21 through a predetermined distance in the direction of the arrow 23. When the solenoid 53 is deenergized, lever 46 is rapidly pivoted into the orientation shown in Figure 2 so that the shoulder 55 engages the next succeeding abutment 43 on the wheel, and the next compartment is then disposed in dispensing relation to the access aperture 60 in the cover 14.

The dispensing movements of the wheel 21 are damped by means of a damper rod 62 having suitable piston means 63 operating in a damper cylinder 64. In sationary position of the wheel 21, the hooked end 62a of the rod 62 rests on one of the abutments 43 of the wheel. As the wheel turns, the rod travels upwardly with the abutment to the dotted position in Figure 2, the piston 63 retarding such movement of the wheel 21. When the wheel stops at its new position, a coil spring 66, of Figure 4, retracts the hooked end 62a out of engagement with the upper abutment, and the rod 62 returns to its lower position shown in solid outline in Figure 2 by gravity, as described and claimed in my previous Patent No. 2,776,035, issued January 1, 1957, hereinafter referred to.

Figure 4:
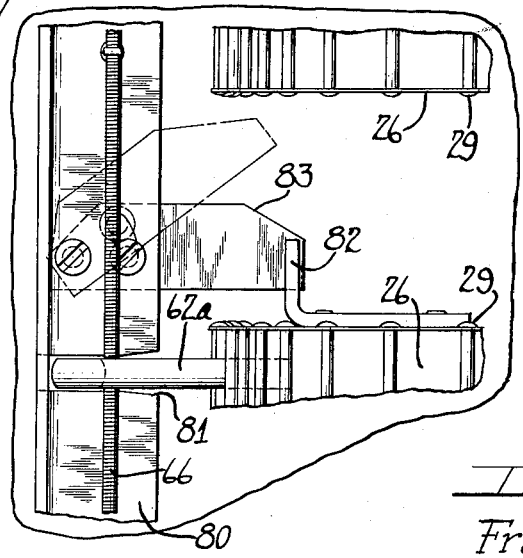
Figure 4 is a fragmentary plan view of the damping sub-assembly of the machine of Figure 1.

Normally, one compartment of each wheel which is initially in registration with the access opening 60 will not have an article therein, so that the wheel 21 must be indexed one position before an article can be removed from the wheel. As the last compartment on the wheel indicated at 27a in Figure 2 comes into the vertical position under the opening 60, an actuator 75 raises switch rod 76 to actuate a respective set of contacts of switches 79 and 80 shown in Figure 5. The switches 79 and 80 thus indicate that the respective dispensing wheels have exhausted their supply of articles to be dispensed. The rod 76 extends through the mounting member 48 to actuate the corresponding set of switches mounted on the opposite side of the mounting member. It will be understood that there is an escapement lever 46 and a switch rod 76 and actuator 75 for each dispensing wheel 21, and it will also be understood that there is a damper rod 62 for each dispensing wheel. As seen in Figure 4, the damping rods are guided by means of an elongated bracket 80 having slots such as 81 therein for allowing outward movement of the respective rods 62 against the action of the coil spring 66 carried by the bracket 80. Each dispensing wheel also carries a stop member 82 which is adapted to cooperate with a stop arm 83 pivotally mounted by the bracket 80.

In refilling the compartments of the wheels, the cover 14 is opened and the damper rods 62 are raised and rotated through 90° to lock the reduced portions 62b thereof in the slots 81. The wheels may then be turned in the reverse direction step by step by the service man to refill the successive compartments.

It will be observed from Figure 2, that the mounting member 48 is pivotally mounted on a shaft 90, and that the mounting member 48 carries at its upper end a hook 91 for cooperation with a fixed hook 92 carried by the body 10. The mounting member 48 is secured in the position shown in Figure 2 by means of a bracket 94 carried thereby and a screw 96 which threadedly engages a cooperating bracket carried by the rear wall 93 of the body 10. By removing the screws 96, the mounting member 48 may be pivoted about the shaft 90 and the hook 91 pivoted into engagement with the fixed hook 92 to retain the mounting member 48 together with the escapement levers 46 and the switch rods 76 out of operative relation to the dispensing wheels 21. With the mounting member in this position, the wheels may be readily removed and replaced through the open upper end of the body 10. The rods 62 may be moved to an inoperative position in relation to the dispensing wheel by raising the rods until the reduced cross section portion 62b of the rods registers with the bracket 80. If the rods 62 are now rotated through 90°, the sides of the slot 81 in Figure 4 will support the rod with the hook end portions 62a out of operative relation to the wheels 21.

Thus, in removing the wheels 21 for cleaning purposes, the screws 96 may be removed, and with the stops 83 in the solid position shown in Figure 4, the mounting member 48 pivoted to its inactive position with the hook 91 engaged with the hook 92. The damping arms 62 are raised and turned to 90° to place them in inactive position relative to the wheel. The tension of each driving spring may now be relieved, and the wheels removed together with the shaft 20 which may be mounted in a notch type bearing.

In order to index the desired dispensing wheel 21, it is now necessary for the customer to insert a coin in the coin slot 100 shown in Figure 1. This causes momentary actuation of coin switch 101 shown in normal position in Figure 5. Momentary actuation of switch 101 completes the following energizing circuit for dispensing relay 102: from supply line 103 through line 104, contact 106 of first relay 107, contact 108 of second relay 109, contact 110 of third relay 111, conductor 112, switch 101 (in actuated position), conductor 114, conductor 115, energizing coil 116 of relay 102, conductor 118, conductor 119 to the other supply line 120.

Energization of dispensing relay 102 moves contact 130 out of engagement with contact 131 and into engagement with contact 132 to complete a holding circuit for relay 102 and moves relay contact 135 into engagement with contact 136.

The holding circuit for relay 102 extends as follows: conductor 115, conductor 197, contact 132, movable contact 130, conductor 199, conductor 200, conductor 201, contact 202 of switch 79, conductor 203, fixed contact 204 of relay 111, movable contact 110, fixed contact 205 and movable contact 108 of relay 109, fixed contact 182 and movable contact 106 of relay 107, conductor 104 and supply line 103.

The customer now selects which of the dispensing wheels he desires to index by depressing one of the buttons 141, 142 or 143 in Figure 1. Buttons 141, 142 and 143 are associated with electric switches 145, 146 and 147 in Figure 5. If the first button 141 is depressed, the first switch contact 145 closes with contact 150 to complete the following circuit: supply line 103, conductor 104, contacts 106, 108 and 110, conductor 112, coin switch contact 101 (in normal position) conductor 160, contact 136, relay contact 135 of relay 102, conductor 163, rectifier 164, conductor 165, switch contact 147, contact 167, switch contact 146, contact 168, switch contact 145, contact 150, conductor 169, coil 172 of relay 107, conductor 173, contact 175, movable contact 176 of switch 80, conductor 179, and supply line 120.

Energization of relay 107 causes movable contact 106 to move out of engagement with contact 182 and into engagement with contact 183. This breaks the holding circuit for relay 102 which in turn causes the interruption of the original energizing circuit for relay 107. Similarly relays 109 or 111 would be energized if buttons 142 or 143 were depressed. Capacitors 190, 191 and 192 serve to maintain relays 107, 109 and 111 in actuated condition for a predetermined time period after the original energizing circuits for the relays have been interrupted. For example, the capacitors may have a capacitance of 40 microfarads and the resistance of coils 172 may be approximately 500 ohms to give a time delay of about .02 second before relays 107, 109 and 111 are deenergized.

Energization of first relay 107 actuates first solenoid coil 53 for rocking the corresponding dispensing lever 46 through the following circuit: supply line 103, conductor 104, movable contact 106, fixed contact 183, conductor 210, coil 53 of the first solenoid, conductor 179, and supply line 120.

The corresponding escapement lever 46 is thus rocked to move the shoulder 55 out of engagement with the abutment 43 and to move the hook 56 into engagement with a succeeding abutment as the wheel is advanced in the direction of the arrow 23 in Figure 2. Atfer the capacitor 190 has sufficiently discharged, relay 107 is deenergized to return the escapement lever 46 into the position shown in Figure 2 with respect to the next succeeding abutment 43. The customer may now remove an article from the compartment of the wheel just indexed into dispensing relation to the opening 60 by opening the door 16 in the cover 14 of the machine.

When one of the wheels has completed its dispensing movement and has no further articles to be dispensed, the actuator 75 in Figure 2 operates switch rod 76 to actuate one of switches 79 and 80 in Figure 5. Movable contact 202 would thus move to its upper position and movable contact 176 would move out of engagement with fixed contact 175 and into engagement with fixed contact 212 to energize light 213 through the following circuit: supply line 103, conductor 220, part of transformer 221, conductor 222, lamp 213, conductor 227, fixed contact 212, movable contact 176 of switch 80, conductor 179 and supply line 120.

It will be readily understood that similar circuits are completed when the other two dispensing wheels are exhausted to light lamps 230 and 231 respectively. When all three wheels are exhausted, contacts 202, 241 and 242 of switch assembly 79 will all be in open position to deenergize coin return relay 245 and thus cause coins thereafter inserted in the slot 100 to be returned. The energizing circuit for coin return relay 245 normally extends as follows: supply line 103, conductor 104, contact 106, contact 182, contact 108, contact 205, contact 110, contact 204, conductor 203, contact 202, conductor 201, conductor 200, conductor 199, movable contact 130, fixed contact 131, conductor 248, coin return relay 245, conductor 119, and supply line 120.

*Summary of operation*

Thus, when a customer inserts the proper coin in slot 100, dispensing relay 102 in Figure 5 is energized. When one of the selector buttons 141, 142 or 143 is depressed, the corresponding relay 107, 109 or 111 is energized and the corresponding dispensing solenoid 53 is energized to retract its armature 51 which retracts the corresponding link 50 and pivots the corresponding escapement lever 46 to begin indexing movement of the selected dispensing wheel 21. Energization of one of the relays 107, 109, or 111 breaks the holding circuit for the dispensing relay 102 to deenergize the selected indexing solenoid 53 which allows spring means (not shown) to return the indexing lever 46 to the orientation shown in Figure 2 with respect to the next succeeding abutment 43. The customer may now open the door 16 and remove the article from the selected dispensing wheel.

In removing the dispensing wheels for cleaning, the mounting member 48 may be pivoted on its shaft 90 and the hook 91 engaged with the fixed hook 92 to retain the indexing levers 46 and switch rods 76 out of operative relation to the dispensing wheel 21. Under such circumstances, the dispensing wheel may be bodily removed from body 10 of the machine through the open top thereof.

It will be observed that push button contacts 145, 146 and 147 are interlocked in series in such a direction that once contact 147 is actuated, contacts 146 and 145 are disconnected from the supply line 103, while contacts 106, 108 and 110 provide a series interlock in the opposite direction such that once relay 107 is energized, contacts 108 and 110 are disconnected from supply line 103. Thus there is no possibility of indexing two of the wheels for the price of one article by pressing two of the selector buttons simultaneously after insertion of the required coin.

Certain features of the illustrated embodiment are claimed in my previous Patent No. 2,776,035, issued January 1, 1957, based on application Serial No. 233,005, filed June 22, 1951, and copending with the present application.

It will be apparent that many modifications and variations may be effected without departing from the scope of the novel concepts of the present invention.

I claim as my invention:

1. A dispensing machine comprising a body having a horizontal shaft therein, a plurality of dispensing wheels mounted on said shaft, a mounting member pivotally mounted in said body in adjacent relation to said wheels, indexing levers carried by said mounting member and operatively associated with the respective wheels for controlling indexing movement thereof, solenoids carried by said mounting member and controlling indexing movement of said respective levers, means accommodating pivotal movement of said mounting member out of operative relation to said wheels, and means for retaining said mounting member in inoperative relation to the wheels in such position that the wheels may be removed from said machine.

2. In a dispensing machine, a shaft, a plurality of dispensing wheels carried on said shaft, indexing mechanism in operative relation to the respective wheels for controlling indexing movement thereof, solenoids disposed for actuating the indexing mechanism associated with the respective wheels, coin actuated electric circuit means controlling selective energization of the respective solenoids to affect indexing operation of the respective wheels, and interlock means in said circuit means operable to prevent simultaneous energization of two of said solenoids.

3. In a dispensing machine, a shaft, a dispensing wheel carried on said shaft, indexing mechanism in operative relation to the wheel, solenoid means for actuating the indexing mechanism, selector relay means controlling energization of the solenoid means, and energy storage means associated with the selector relay means to maintain the selector relay means energized for a predetermined time period.

4. In a dispensing machine, a body having an open top, a cover pivotally secured to the top for closing the body, a horizontal shaft removably mounted in the body, an access door mounted in said cover, a dispensing wheel mounted on said shaft and positioned for rotational movement immediately beneath said access door, an indexing mechanism for controlling rotational movement of said wheel and including mounting means pivotally mounted on said body beneath said cover to provide movement of said indexing mechanism selectively between operative and inoperative positions relative to said wheel, and means for maintaining said indexing mechanism in its said inoperative position whereby said wheel and shaft may be removed from said body.

References Cited in the file of this patent

UNITED STATES PATENTS

| | | |
|---|---|---|
| 372,010 | Brunet | Oct. 25, 1887 |
| 1,717,705 | Hanney | June 18, 1929 |
| 2,017,078 | Schwab | Oct. 15, 1935 |
| 2,384,156 | Burdette | Sept. 4, 1945 |
| 2,660,282 | Gross | Nov. 24, 1953 |
| 2,776,035 | Hebel | Jan. 1, 1957 |